United States Patent [19]
Knudsen

[11] Patent Number: 5,227,181
[45] Date of Patent: Jul. 13, 1993

[54] MULTI-CAVITY MELT DISTRIBUTION MANIFOLD

[75] Inventor: Jerry A. Knudsen, St. Charles, Ill.

[73] Assignee: Mold-Masters Limited, Georgetown, Canada

[21] Appl. No.: 884,601

[22] Filed: May 15, 1992

Related U.S. Application Data

[63] Continuation of Ser. No. 646,394, Jan. 28, 1991, abandoned.

[30] Foreign Application Priority Data

Dec. 19, 1990 [CA] Canada ................. 2032396

[51] Int. Cl.⁵ ............................................. B29C 45/20
[52] U.S. Cl. ............................. 425/549; 264/328.8; 264/328.15; 425/572
[58] Field of Search .............. 425/549, 570, 571, 572, 425/588; 264/328.15, 328.8

[56] References Cited

U.S. PATENT DOCUMENTS

| | | | |
|---|---|---|---|
| 3,940,224 | 2/1976 | Armour | 425/533 |
| 4,609,138 | 9/1986 | Harrison | 228/161 |
| 4,620,958 | 11/1986 | Wiechard | 425/572 |
| 4,648,546 | 3/1987 | Gellert | 228/161 |
| 4,688,622 | 8/1987 | Gellert | 164/61 |
| 4,761,343 | 8/1988 | Gellert | 425/547 |
| 4,820,147 | 4/1989 | Gellert | 425/549 |
| 4,832,254 | 5/1989 | Peuke et al. | 228/174 |

FOREIGN PATENT DOCUMENTS

| | | |
|---|---|---|
| 457166 | 11/1991 | European Pat. Off. |
| 2114465 | 10/1972 | Fed. Rep. of Germany |
| 2548582 | 1/1985 | France |
| 1200326 | 7/1970 | United Kingdom |

OTHER PUBLICATIONS

Your Connection to Injection Molding Excellence: Modular Manifolds, Apr. 1986.

*Primary Examiner*—Tim Heitbrink
*Attorney, Agent, or Firm*—Griffin Butler Whisenhunt & Kurtossy

[57] ABSTRACT

An injection molding manifold for distributing pressurized melt from a common inlet to thirty two outlets. The steel manifold has rear and forward plate portions which are integrally brazed together. The rear portion is drilled and plugged along a first transverse plane to provide the melt passage with branches from a common inlet portion to four intermediate portions. Four sets of matching grooves are machined in the joining faces of the rear and forward portions whereby each intermediate portion of the melt passage in turn branches along a second transverse plane to eight outlet portions, each leading to a cavity. The combination of the melt passage branching in several different directions in two different transverse planes with the second plane having different sets of curved portions allows the melt passage to have a large number of outlets while still having smoothly curved bends without having a leakage problem.

3 Claims, 3 Drawing Sheets

MULTI-CAVITY MELT DISTRIBUTION MANIFOLD

This application is a continuation, of Ser. No. 07/646,394, filed Jan. 28, 1991, now abandoned.

BACKGROUND OF THE INVENTION

The invention relates generally to injection molding and more particularly to an improved multi-cavity melt distribution manifold.

Heated manifolds which distribute melt from a single inlet to a number of spaced outlets are well known in the art. It is also well known that the length and size of the melt passage through the manifold must be equal or balanced and that sharp corners or bends can produce unacceptable shear stress in the melt. For instance, U.S. Pat. No. 4,609,138 to Harrison which issued Sep. 2, 1986 shows a drill and plug method of making manifolds. This method has the disadvantage that it is difficult to provide bends in the melt passage without sharp corners. U.S. Pat. No. 4,648,546 to Gellert which issued Mar. 10, 1987 describes making a manifold out of composite plates in which the melt passage is machined. While this does provide for the melt passage having smoothly curved bends, it has the disadvantage that leakage can result if there are a large number of cavities and very high pressures are required to fill the cavities.

These problems are overcome by using a number of manifolds in a balanced bridging arrangement as shown in U.S. Pat. No. 4,761,343 to Gellert which issued Aug. 2, 1988. However, this has the disadvantage that a number of different manifolds are required. A manifold which does provide a melt passage with smoothly curved bends and a number of radially spaced outlets by casting is shown in Gellert Canadian patent application Ser. No. 2,017,055 filed May 17, 1990 entitled "Injection Molding Cast Manifold."

SUMMARY OF THE INVENTION

Accordingly, it is an object of the present invention to at least partially overcome the problems of the prior art by providing a single melt distribution manifold with a melt passage having smoothly curved bends which branches in two different parallel planes to a large number of spaced outlets.

To this end, in one of its aspects, the invention provides a heated injection molding melt distribution manifold having a rear face, a forward face, and a melt passage which extends therethrough and branches therein from a single common inlet on the rear face to a plurality of spaced outlets on the forward face, having the improvement wherein the melt passage has an inlet portion extending from the inlet on the rear face to a first transverse plane wherein the inlet portion of the melt passage branches to at least four spaced intermediate portions of the melt passage, each intermediate portion of the melt passage extending from the first transverse plane to a second transverse plane wherein each intermediate portion branches to eight spaced outlet portions of the melt passage, each outlet portion of the melt passage extending from the second transverse plane to one of the outlets on the forward face of the manifold, the melt passage extending an equal distance between the common inlet on the rear face of the manifold and each of the spaced outlets on the forward face of the manifold.

Further objects and advantages of the invention will appear from the following description, taken together with the accompanying drawings.

DETAILED DESCRIPTION OF THE DRAWINGS

Figure 1:
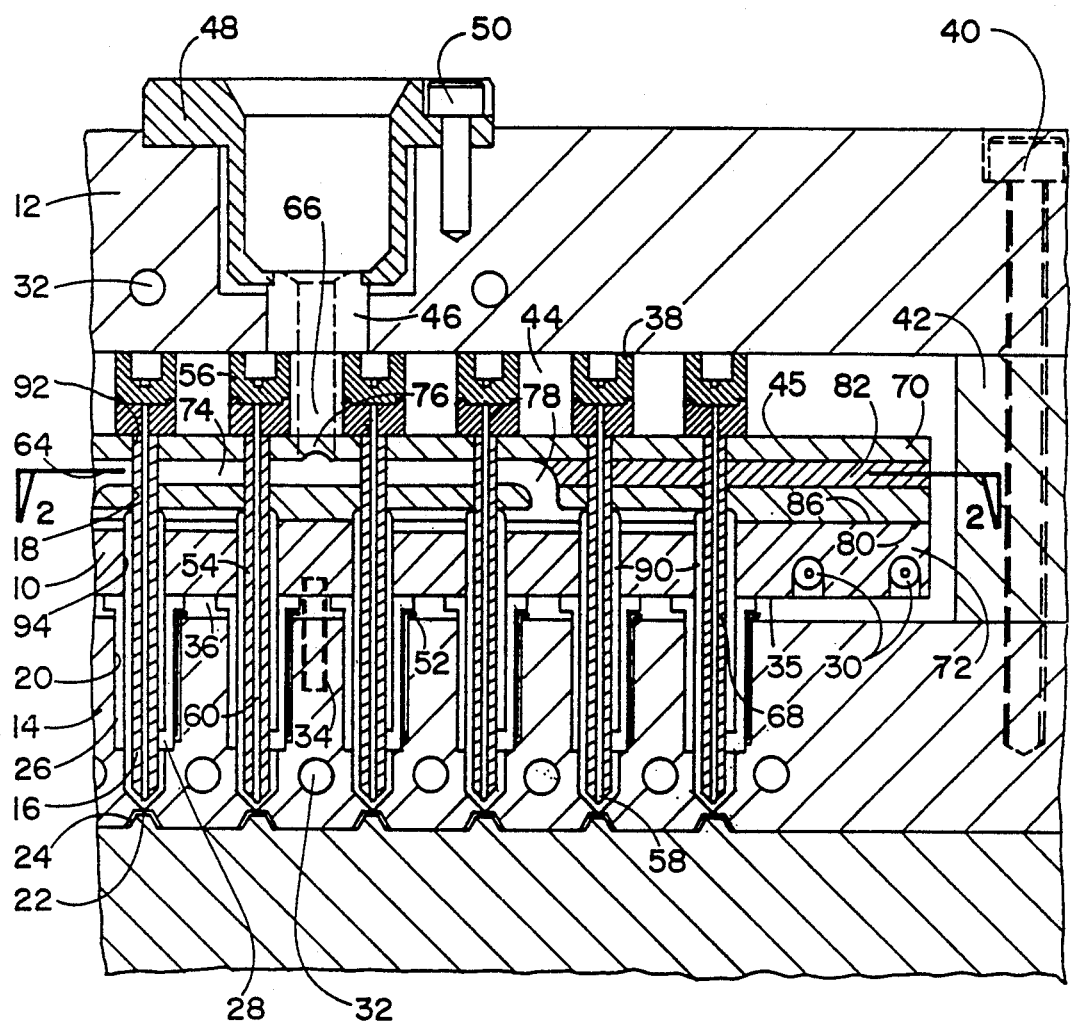
FIG. 1 is a partial sectional view of a multi-cavity injection molding system having a melt distribution manifold according to a first embodiment of the invention.

Reference is first made to FIG. 1 which shows part of a multi-cavity injection molding system having a heated melt distribution manifold 10 according to a preferred embodiment of the invention extending between a backplate 12 and a cavity plate 14. The system has a number of spaced heated probes 16, each of which extends through a bore 18 through the manifold 10 and into a well 20 which extends in the cavity plate 14 to a gate 22 leading to one of the cavities 24. The probe 16 is accurately located by a locating sleeve 26 which is seated in the well 20 and has three radially spaced fins 28 which contact the probe, similar to that shown in Gellert U.S. Pat. No. 4,820,147 which issued Apr. 11, 1989. The manifold 10 is heated by an electrical heating element 30 with external terminals 31 which is integrally cast into it as described in the U.S. Pat. No. 4,688,622 to Gellert which issued Aug. 25, 1987. The cavity plate 14 and the back plate 12 are cooled by pumping cooling water through conduits 32. The manifold 10 is located by a central locating ring 34 which is seated between the forward face 35 of the heated manifold 10 and the cooled cavity plate 14 and provides an insulative air space 36 between them. The back plate 12 is held securely against the rear end 38 of the probes 16 by bolts 40 which extend through a spacer plate 42 into the cavity plate 14. This 10 similarly provides an insulative air space 44 between the rear face 45 of the heated manifold 10 and the cooled back plate 12. A manifold extension 46 is secured in place by a locating collar 48 which is fastened to the back plate 12 by bolts 50. A thermocouple 52 extends into one of the fins 28 to monitor the temperature of the melt flowing past it.

Each probe 16 has a generally cylindrical steel body 54 with an enlarged portion 56 at the rear end 38 and a pointed forward end 58 which is in alignment with one of the gates 22 leading to a cavity 24. An electrically insulated heating element 60 extends centrally in the body 54 to an external electrical terminal (not shown), as described in detail in Gellert Canadian patent application Ser. No. 2,032,728-6 filed Dec. 19, 1990 entitled "Injection Molding Probe with Varying Heat Profile."

A melt passage 64 extends through the manifold extension 46 to a common inlet 66 on the rear face 45 of the manifold 10. As described in detail below, it branches in the manifold 10 to a plurality of outlets 68 around the probes 16 on the forward face 35 of the manifold 10, to convey pressurized melt to each of the cavities 24. The manifold 10 is made of a tool steel rear plate portion 70 and a tool steel forward plate portion 72. The rear plate portion 70 has lateral holes 74 which are drilled in a first transverse plane parallel to the forward and rear faces 35, 45 of the manifold. In this embodiment, these lateral holes 74 are drilled in an H-shaped configuration, but they can have other balanced configurations. These lateral holes 74 branch to connect a single inlet portion 76 of the melt passage 64 which is drilled from the rear face 45 to four equally spaced intermediate portions 78 of the melt passage 64 which are drilled from the forward face 80 of the rear plate portion 70 of the manifold 10. Steel plugs 82 which are machined to provide a smoothly curved bend in the melt passage are then brazed in the lateral holes 74, as described in U.S. Pat. No. 4,609,138 referred to above.

Figure 3:
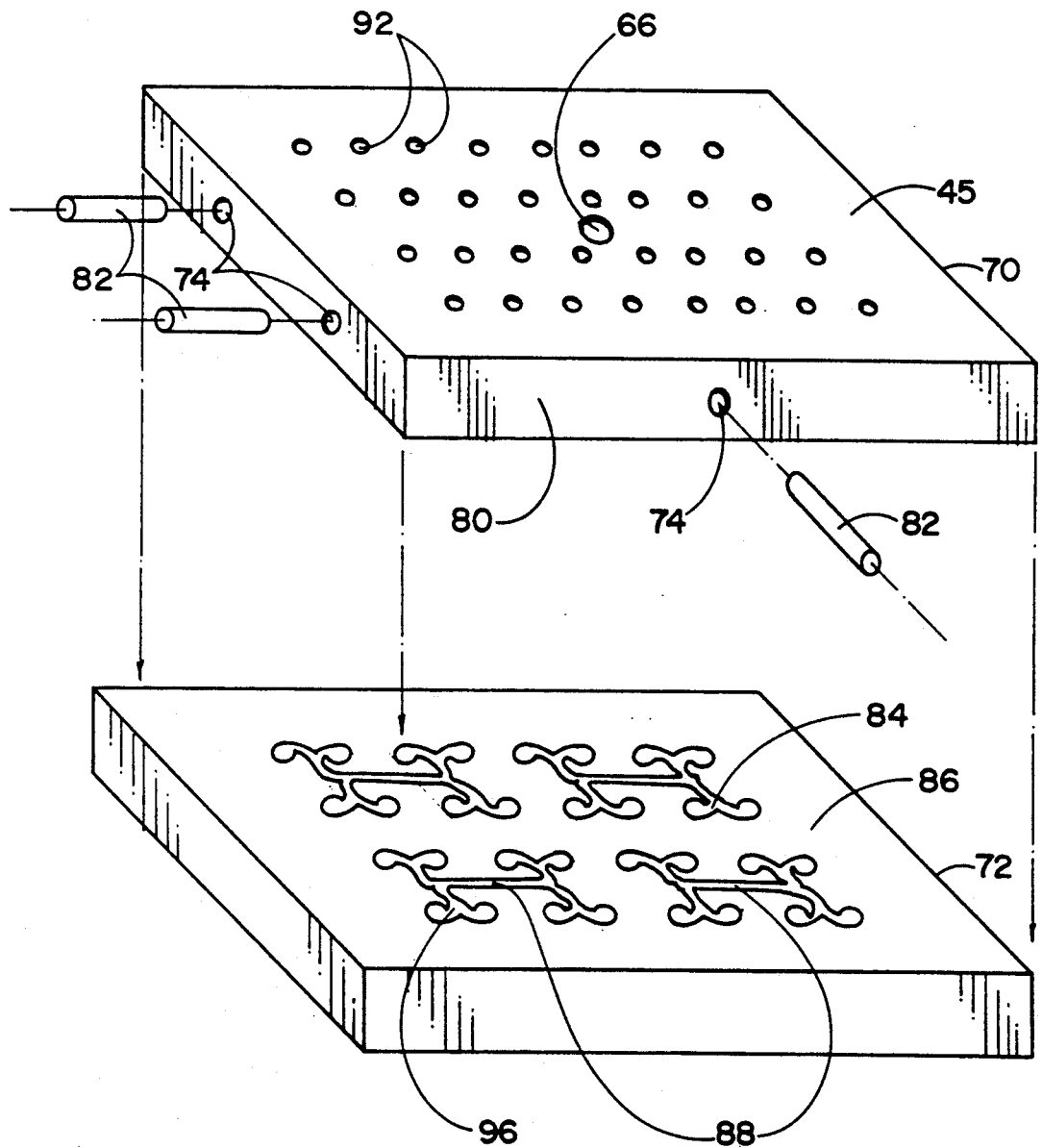
FIG. 3 is an isometric view showing the two plate portions of the manifold before they are brazed together.

As best seen in FIG. 3, matching grooves 84 are machined in the rear face 86 of the forward plate portion 72 and the forward face 80 of the rear plate portion 70 of the manifold 10. As shown, in this embodiment, there are four sets 88 of the matching grooves 84. When the two plate portions 70, 72 are brazed together to form the manifold 10, as described in U.S. Pat. No. 4,648,546 referred to above, each set 88 of machined grooves 84 branch in a second transverse plane to connect one of the intermediate portions 78 of the melt passage 64 to eight equally spaced outlet portions 90 of the melt passage 64 which extend to each of the outlets 68 on the forward face 35 of the manifold 10. As can be seen, the grooves 84 are machined to have smoothly curved bends to minimize the stress on the pressurized melt flowing through the melt passage 64.

The bores 18 which are machined through the manifold 10 to receive the probes 16 each have a rear portion 92 and a forward portion 94. The rear portion 92 extends through the rear plate portion 70 of the manifold 10 and has a diameter just large enough to snugly receive one of the elongated probes 16 therethrough without allowing leakage of the pressurized melt between them. The forward portion 94 of each bore 18 extends through the forward plate portion 72 of the manifold 10 and is sufficiently larger in diameter than the rear portion 92 to provide the outlet portion 90 of the melt passage 64 along around the probe 16 which extends therethrough.

Thus, the melt passage 64 in the manifold 10 has a configuration where it branches laterally twice in two different transverse planes. First, the single inlet portion 76 branches to four intermediate portions 78. Then, each intermediate portion 78 branches to eight outlet portions 90. Thus, in this embodiment, the heated manifold 10 distributes the melt from the single inlet 66 to thirty two spaced outlets 68 to convey the melt to thirty two different cavities 24. If the melt passage branches to all thirty two outlets in the single transverse plane where the rear and forward plate portions join in a system such as shown in U.S. Pat. No. 4,648,546 mentioned above, it has been found that there can be melt leakage along the potential fault line where the two plate portions are brazed together. This is due to the high injection pressure of the melt which can be as high as 50,000 psi in some instances. Having the melt passage branch in two different transverse planes with each set 88 of grooves 84 leading to only eight outlet portions 90 overcomes this leakage problem. Of course, if a different drilling and plugging configuration is used in the rear plate portion 70 to provide the melt passage 64 with more than four intermediate portions 78, the melt passage can have a greater number of outlets.

Figure 2:
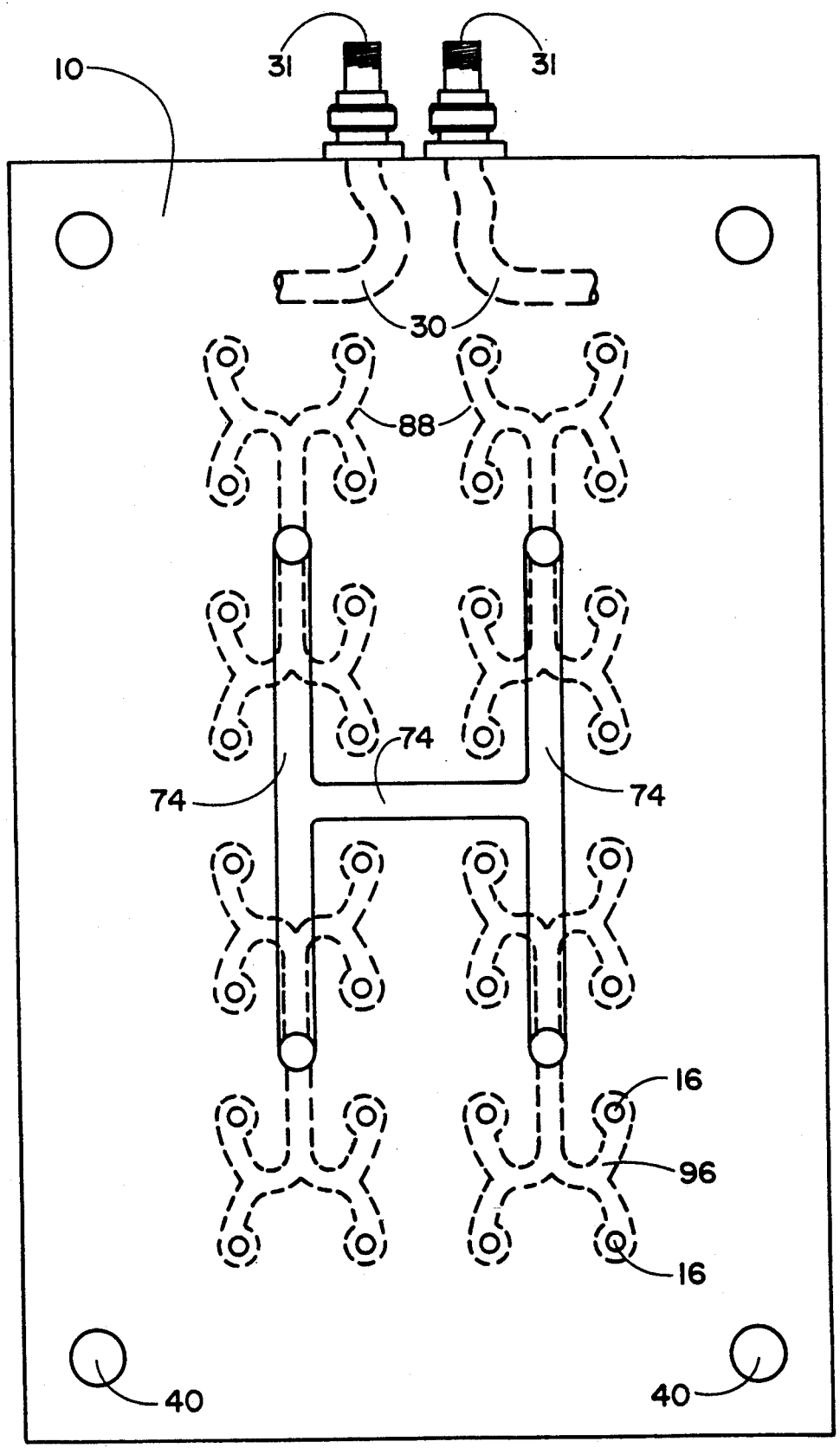
FIG. 2 is a sectional view along line 2—2 in FIG. 1.

In use, the injection molding system or apparatus is assembled as shown in FIG. 1. Electrical power is applied to the heating element 30 in the manifold 10 and the heating element 60 in each probe 10 to heat them to a predetermined operating temperature. Pressurized melt from a molding machine (not shown) is then injected into the melt passage 64 through the common inlet 66 according to a predetermined cycle in a conventional manner. The pressurized melt flows through the heated manifold 10, first branching in the first transverse plane to the four intermediate portions 78, and then branching in the second transverse plane to the thirty two outlet portions 90. The melt then flows along around each heated probe 10 and through the gates 16 to fill the cavities 18. Each set 8 of grooves 84 are machined to form eight curved portions 96 of the melt passage 64 which extend along the second transverse plane where the rear and forward plate portions 70, 72 are brazed together to extend from each intermediate portion 78 to eight spaced outlet portions 90 which can be arranged in two or more rows. Each of the curved portions 96 is substantially smaller in diameter than the forward portion 94 of the bore 18 which provides each outlet portion 90 of the melt passage 64 along around one of the probes 16. As seen in FIG. 2, the curved portion 96 is somewhat offset to one side of the probe 16 where it joins the forward portion 94 of the bore 18. This imparts a swirling spiral motion to the melt as it flows through the outlet portion 90 of the melt passage 64 along around the heated probe 10 to the gate 16. The swirling spiral motion of the melt reduces the possibility of dead spots behind the probe in the melt passage and provides for faster colour and material changes.

After the cavities are filled, injection pressure is held momentarily to pack and then released. After a short cooling period, the mold is opened to eject the molded products. After ejection, the mold is closed and injection pressure is reapplied to refill the cavities 24. This cycle is continuously repeated with a frequency dependent on the size and shape of the cavities and the type of material being molded.

While the preferred embodiment of the manifold 10 is shown and described as receiving heated probes 16, it can also be used with heated nozzles mounted to abut against the forward face 35 of the manifold 10 instead. In that arrangement, each bore 18 would only extend through the forward plate portion 72 of the manifold 10 to form an outlet portion 90 of the melt passage 64 extending into a central bore through each heated nozzle leading to the gate 22.

While the description of the heated manifold has been given with respect to preferred embodiments, it is not to be construed in a limiting sense. Variations and modifications will occur to those skilled in the art. For instance, the branching configuration of the melt passage in each of the two transverse planes can be different to provide different arrays of outlets 68 for different applications. Reference is made to the appended claims for a definition of the invention.

The embodiments of the invention in which an exclusive property or privilege is claimed are defined as follows:

1. A unitary injection molding distribution manifold which branches at only two transverse planes to provide at least thirty-two outlets from a single common inlet, comprising:
   (1) two brazed-together plates forming a unitary distribution manifold having a first plate with a rear face and a second plate with a forward face and first and second spaced-apart transverse planes which extend parallel to and lie between the rear and forward faces;

(2) a single melt passage extending generally longitudinally in the manifold from the rear face to the forward face and having:

(a) an unbranched, single, common inlet portion extending longitudinally from an inlet on the rear face to the first transverse plane where the melt passage branches in that transverse plane to at least four spaced-apart, unbranched first transverse plane passages;

(b) at least four spaced-apart, unbranched intermediate portions, each of which extends longitudinally from one respective first transverse plane passage to the second transverse plane where the melt passage branches in that second transverse plane to at least thirty-two second unbranched transverse plane passages;

(c) at least thirty-two spaced-apart, unbranched outlet portions, each of which extends longitudinally from one respective second transverse plane passage to a respective outlet on the forward face; and wherein the melt passage extends an equal distance between the inlet and each outlet.

2. An injection molding manifold as claimed in claim 1 having a plurality of spaced bores, each bore extending through the manifold from the rear face to the forward face to receive an elongated heated probe therethrough, each bore having a rear portion and a forward portion, the rear portion of each bore extending from the rear face of the manifold to the second transverse plane and having a diameter to snugly receive the elongated probe therein, the forward portion of each bore providing one of the outlet portions of the melt passage extending from the second transverse plane to one of the outlets on the forward face of the manifold, the forward portion of each bore being larger in diameter than the rear portion of the bore and the heated probe extending through the bore, whereby the outlet portion of the melt passage extends along around the heated probe extending through the forward portion of the bore.

3. An injection molding manifold as claimed in claim 2 wherein at the second transverse plane the melt passage branches to at least eight curved portions of the melt passage, each of the curved portions extending in the second transverse plane to the forward portion of a respective one of the probe receiving bores, the curved portion of the melt passage being substantially smaller in diameter than the forward portion of the bore, the curved portion of the melt passage joining the forward portion of the bore being offset to one side of the heated probe extending through the bore to impart a swirling motion to melt flowing from the curved portion of the melt passage into the forward portion of the bore around the heated probe extending therethrough.

* * * * *